US009787215B2

(12) United States Patent
Ohno et al.

(10) Patent No.: US 9,787,215 B2
(45) Date of Patent: Oct. 10, 2017

(54) POWER SOURCE DEVICE

(71) Applicant: Panasonic Intellectual Property Management Co., Ltd., Osaka (JP)

(72) Inventors: Makoto Ohno, Mie (JP); Shota Yamamoto, Osaka (JP); Ichiro Ishida, Mie (JP); Tetsuya Ishitsuka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/300,741

(22) PCT Filed: May 25, 2015

(86) PCT No.: PCT/JP2015/002609
§ 371 (c)(1),
(2) Date: Sep. 29, 2016

(87) PCT Pub. No.: WO2015/182101
PCT Pub. Date: Dec. 3, 2015

(65) Prior Publication Data
US 2017/0019033 A1 Jan. 19, 2017

(30) Foreign Application Priority Data
May 30, 2014 (JP) ................. 2014-112091

(51) Int. Cl.
*H02M 7/00* (2006.01)
*H02M 3/158* (2006.01)
(Continued)

(52) U.S. Cl.
CPC .............. *H02M 7/003* (2013.01); *G05F 1/56* (2013.01); *H02M 3/00* (2013.01); *H02M 3/1584* (2013.01); *H02M 1/32* (2013.01)

(58) Field of Classification Search
CPC ...... H02M 7/003; H02M 3/1584; H02M 1/32; G05F 1/56
See application file for complete search history.

(56) References Cited

U.S. PATENT DOCUMENTS 6,373,275 B1 * 4/2002 Otsuka ................ G06F 13/4086
326/30
7,882,372 B2 * 2/2011 Chapuis ................ G06F 1/329
323/371
(Continued)

FOREIGN PATENT DOCUMENTS

JP 2004-173334 6/2004
JP 2009-177909 8/2009
(Continued)

OTHER PUBLICATIONS

English translation of JP JP 2013074763 , Kimichi Atsushi, Power Conversion Device and Control Method Thereof, Apr. 22, 2013.*
(Continued)

*Primary Examiner* — Timothy J Dole
*Assistant Examiner* — Sisay G Tiku
(74) *Attorney, Agent, or Firm* — McDermott Will & Emery LLP

(57) ABSTRACT

A power supply device includes a board that includes an input terminal and an output terminal, and converters disposed on the board. The converters are connected with each other in parallel and convert an input voltage input to the input terminal, and output the converted voltage to the output terminal. Each of the converters includes respective one of voltage conversion functional units including respective one of input parts and respective one of output parts, respective one of input line parts connected to respective one of the input parts. Respective one of output line parts connected to respective one of the output parts, and respective one of current adjustment functional units provided in
(Continued)

respective one of the output line parts for balancing currents output from the each of the converters provided in respective one of the output line parts.

9 Claims, 7 Drawing Sheets

(51) Int. Cl.
*H02M 1/32* (2007.01)
*G05F 1/56* (2006.01)
*H02M 3/00* (2006.01)

(56) References Cited

U.S. PATENT DOCUMENTS

| | | | | |
|---|---|---|---|---|
| 2002/0011976 | A1* | 1/2002 | Hashimoto | G09G 3/3233 345/76 |
| 2003/0112647 | A1* | 6/2003 | Liu | H02J 1/102 363/144 |
| 2008/0238208 | A1* | 10/2008 | Potter | G06F 1/26 307/75 |
| 2009/0184700 | A1 | 7/2009 | Kanayama | |
| 2012/0327604 | A1* | 12/2012 | Yang | H02M 7/003 361/716 |
| 2013/0222099 | A1* | 8/2013 | Li | H01F 17/0006 336/5 |
| 2013/0342968 | A1* | 12/2013 | Peterson | H05K 7/1457 361/622 |

FOREIGN PATENT DOCUMENTS

| | | |
|---|---|---|
| JP | 2012-157118 | 8/2012 |
| JP | 2013-074763 | 4/2013 |
| JP | 2013074763 A * | 4/2013 |

OTHER PUBLICATIONS

International Search Report of PCT application No. PCT/JP2015/002609 dated Aug. 25, 2015.

* cited by examiner

POWER SOURCE DEVICE

CROSS-REFERENCE TO RELATED APPLICATIONS

This application is a U.S. national stage application of the PCT international application No. PCT/JP2015/002609 filed on May 25, 2015, which claims the benefit of foreign priority of Japanese patent application No. 2014-112091 filed on May 30, 2014, the contents all of which are incorporated herein by reference.

TECHNICAL FIELD

The present disclosure relates to a power supply device used in various electronic apparatuses.

BACKGROUND ART

FIG. 6 is a circuit block diagram of conventional power supply device 1. Power supply device 1 includes input terminal 2, output terminal 3, plural converters 4, 5, and 6, and output conductor unit 7. Overcurrent limiters 4A, 5A, and 6A are provided in plural converters 4, 5, and 6, respectively.

Power supply device 1 including converters 4, 5, and 6 can supply a large amount of power to output terminal 3. Converters 4, 5, and 6 share supplying of power individually to output terminal 3, thereby improving operational efficiency in each of converters 4, 5, and 6.

Overcurrent limiters 4A, 5A, and 6A are set such that a current larger than or equal to a predetermined threshold value is not output from each of converters 4, 5, and 6. Overcurrent limiters 4A, 5A, and 6A prevent degradation relating to a lifetime of power supply device 1 due to flowing of an excessive current (for example, see PTL 1).

CITATION LIST

Patent Literature

PTL 1: Japanese Patent Unexamined Publication No. 2013-74763

SUMMARY

A power supply device according to the present disclosure includes a board that includes an input terminal and an output terminal, and converters disposed on the board. The converters are connected with each other in parallel and convert an input voltage input to the input terminal, and output the converted voltage to the output terminal. Each of the converters includes respective one of voltage conversion functional units including respective one of input parts and respective one of output parts, respective one of input line parts connected to respective one of the input parts. Respective one of output line parts connected to respective one of the output parts, and respective one of current adjustment functional units provided in respective one of the output line parts for balancing currents output from the each of the converters provided in respective one of the output line parts.

This configuration suppresses variation of the current supplied from each of the converters and thus, a burden of outputting a large amount of power is not concentrated on a particular converter out of the converters. Each of the converters can sufficiently exhibit the capability related to the current supply. As a result, an operation range is expanded in the power supply device.

DETAIL DESCRIPTION OF PREFERRED EMBODIMENT

Figure 6:
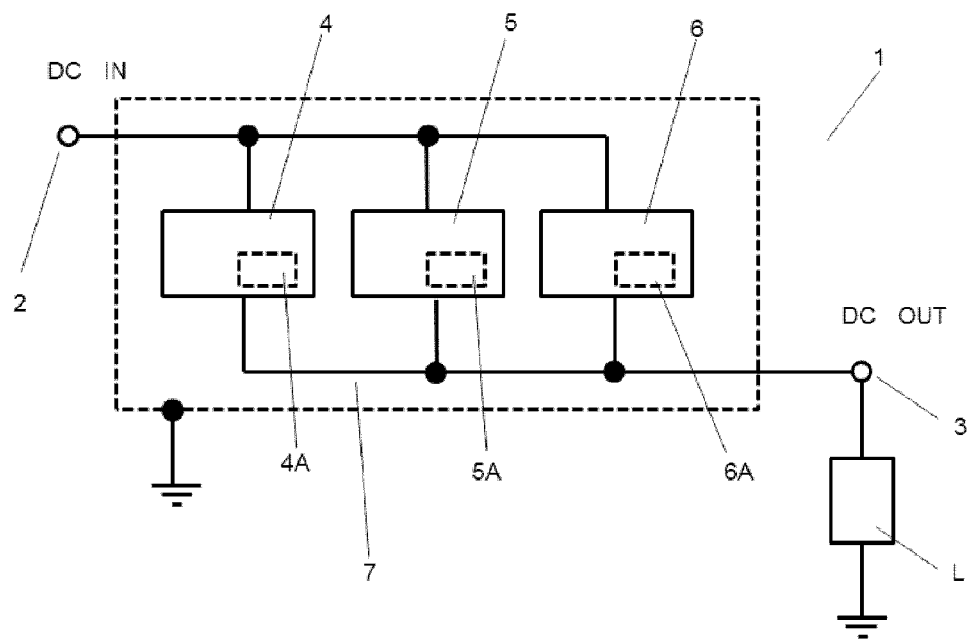
FIG. 6 is a circuit block diagram of a conventional power supply device.

Prior to description of the present exemplary embodiment, a problem to be solved in conventional power supply device 1 illustrated in FIG. 6 will be described. In power supply device 1, respective distances from respective converters 4, 5, and 6 to output terminal 3 through output conductor unit 7 are different from each other. Therefore, direct-current (DC) resistances from converters 4, 5, and 6 to output terminal 3 are different from each other. That is, in power supply device 1, a DC resistance from converter 4 to output terminal 3 is the largest and a DC resistance from converter 6 to output terminal 3 is the smallest.

Figure 7:
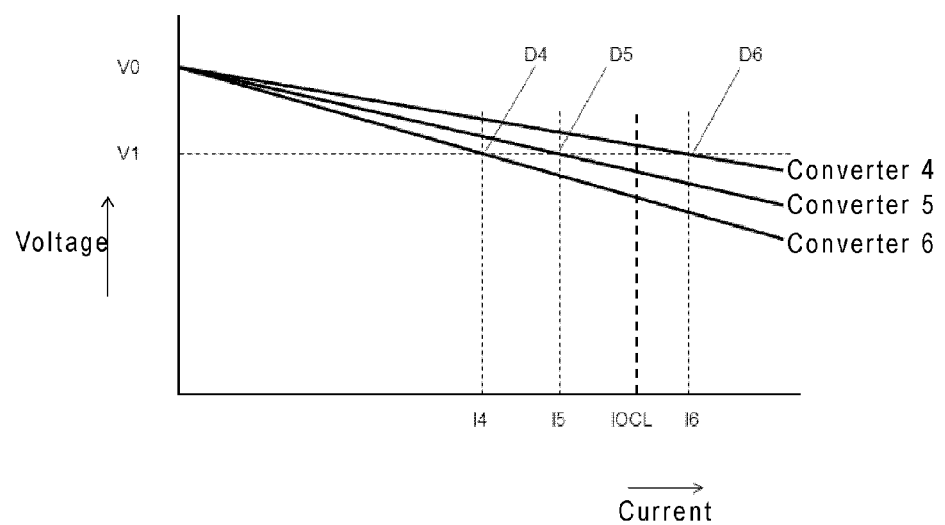
FIG. 7 is an operational relationship diagram of the conventional power supply device.

Therefore, in power supply device 1, although converters 4, 5, and 6 have the same characteristic, for example, as illustrated in FIG. 7, operation characteristics of respective converters 4, 5, and 6 are significantly different from each other.

FIG. 7 is an operational relationship diagram of power supply device 1. In FIG. 7, when an output voltage at the left end is V0, load L is not connected to output terminal 3 and a current is not supplied to output conductor unit 7. When load L is connected to output terminal 3 and voltage V1 is output from output terminal 3, converters 4, 5, and 6 supply currents I4, I5, and I6, respectively, and power is output.

In this case, a resistance from converter 4 to output terminal 3 is larger than a resistance from converter 5 to output terminal 3 while a resistance from converter 5 to output terminal 3 is larger than a resistance from converter 6 to output terminal 3. Therefore, current I6 is larger than current I5, and current I5 is larger than current I4.

When load L increases and the current is supplied to load L by exceeding a supply permissible limit, the current supplied from converters 4, 5, and 6 increase accordingly. The output current exceeds threshold IOCL at which an overcurrent limitation function operates in the order of converters 6, 5, and 4. FIG. 7 illustrates state in which current I6 supplied from converter 6 exceeds threshold IOCL.

When the currents supplied from converters 4, 5, and 6 exceed threshold IOCL, overcurrent limiters 4A, 5A, and 6A start an overcurrent limitation functions, respectively. Here, current I6 supplied from converter 6 exceeds threshold IOCL, and starts overcurrent limiter 6A, thereby causing converter 6 to stop supplying of the current.

When converter 6 stops the supplying of current, converters 4 and 5 supply currents to output terminal 3 for supplementing a shortage amount according to current I6 supplied from converter 6. However, the currents supplied from converters 4 and 5 also exceed threshold IOCL shortly in the order of converters 4 and 5. As a result, all converters 4, 5, and 6 stop the supply of the currents, consequently causing power supply device 1 to stop a power supply function.

In other words, the DC resistances become different in output conductor part 7, and thus, the supply currents from converters 4, 5, and 6 are different from each other. Therefore, operating points D4, D5, and D6 of converters 4, 5, and 6 are required to have large margins with respect to threshold IOCL and to be different from each other.

As a result, each of converters 4, 5, and 6 cannot sufficiently exhibit a function regarding the current supply which is equipped in each of converters 4, 5, and 6 and an operation range regarding the current supply which is equipped in power supply device 1 becomes narrower.

Figure 1:
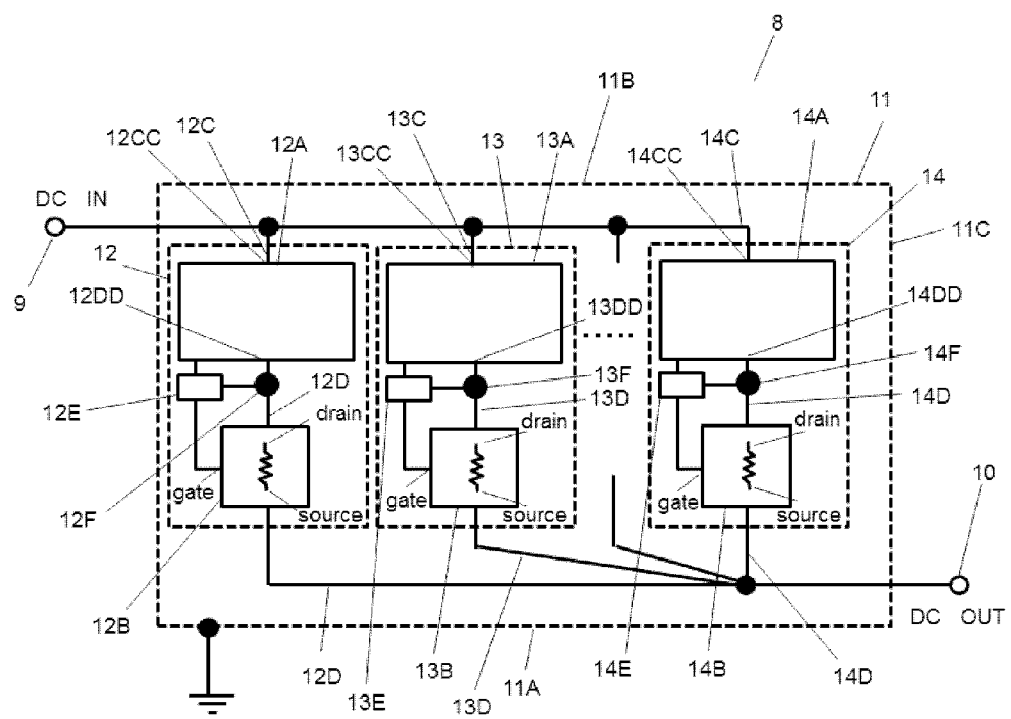
FIG. 1 is a circuit block diagram of a power supply device in accordance with an exemplary embodiment.

An exemplary embodiment will be described below with reference to drawings. FIG. 1 is a circuit block diagram of power supply device 8 in accordance with the embodiment.

Power supply device 8 includes converters 12, 13, and 14 and board 11 including input terminal 9 and output terminal 10. Converters 12, 13, and 14 are disposed on board 11 and connected in parallel with each other. Converters 12, 13, and 14 include voltage conversion functional units 12A, 13A, and 14A, respectively. Voltage conversion functional units 12A, 13A, and 14A have the same characteristic or substantially equal characteristics. Voltage conversion functional units 12A, 13A, and 14A convert a DC input voltage which is input to input terminal 9 into DC output voltage different from the input voltage, and output the DC output voltage to output terminal 10.

Converters 12, 13, and 14 include voltage conversion functional units 12A, 13A, and 14A, current adjustment functional units 12B, 13B, and 14B, input line parts 12C, 13C, and 14C, and output line parts 12D, 13D, and 14D, respectively. Voltage conversion functional units 12A, 13A, and 14A include input parts 12CC, 13CC, and 14CC and output parts 12DD, 13DD, and 14DD, respectively. Input line parts 12C, 13C, and 14C are connected with input parts 12CC, 13CC, and 14CC, respectively. Output line parts 12D, 13D, and 14D are connected with output parts 12DD, 13DD, and 14DD, respectively. Current adjustment functional units 12B, 13B, and 14B are provided in output line parts 12D, 13D, and 14D and balance the currents from converters 12, 13, and 14, respectively.

This configuration described above allows converters 12, 13, and 14 to supply currents equalized and having small variation among the currents to output terminal 10 with a constant voltage. With this, in each of converters 12, 13, and 14, the overcurrent limitation function is set with a threshold having an appropriate margin with respect to the current supply capability equipped in converters 12, 13, and 14. In other words, converters 12, 13, and 14 can sufficiently exhibit the current supply capability. As a result, power supply device 8 can have a wide operation range. In other words, an output voltage and an output current may be set with a wide range.

A configuration and operations of power supply device 8 will be detailed below. Converters 12, 13, and 14 include controllers 12E, 13E, and 14E, respectively. Controllers 12E, 13E, and 14E detect voltages of output parts 12DD, 13DD, and 14DD at detection points 12F, 13F, and 14F connected to output parts 12DD, 13DD, and 14DD, respectively. Controllers 12E, 13E, and 14E control operations of voltage conversion functional units 12A, 13A, and 14A and operations of current adjustment functional units 12B, 13B, and 14B based on the detected voltage, respectively.

Voltage drops are produced in output line parts 12D, 13D, and 14D and current adjustment functional units 12B, 13B, and 14B. Therefore, the voltages detected at detection points 12F, 13F, and 14F are different from the voltage at output terminal 10.

Controllers 12E, 13E, and 14E control voltage conversion functional units 12A, 13A, and 14A as to adjust the current required for the load (not illustrated) connected to output terminal 10. In other words, controllers 12E, 13E, and 14E control voltage conversion functional units 12A, 13A, and 14A to allow converters 12, 13, and 14 to supply, to the load, the power required for the load.

Board 11 has a rectangular shape. One side of sides of the rectangular shape extending in a longer-side direction is input terminal side 11B while another side of the sides of the rectangular shape in the longer-side direction is output terminal side 11A. One side of sides the rectangular shape extending in a shorter-side direction close to output terminal 10 is output terminal shorter side 11C. Input line parts 12C, 13C, and 14C constitute wiring in a region in a direction of input terminal side 11B of converters 12, 13, and 14. Output line parts 12D, 13D, and 14D connected to output terminal 10 constitute wirings in a region in a direction of output terminal side 11A of converters 12, 13, and 14.

As described above, voltage conversion functional units 12A, 13A, and 14A have the same characteristics. Controllers 12E, 13E, and 14E control voltage conversion functional units 12A, 13A, and 14A such that output powers of voltage conversion functional units 12A, 13A, and 14A are substantially the same value based on the voltages and the currents at detection points 12F, 13F, and 14F.

However, converters 12, 13, and 14 are disposed in rectangular board 11 along a line, and thus, distances by which respective one of voltage conversion functional units 12A, 13A, and 14A is separated from terminal 10 are different from one another. In other words, the DC resistances of output line parts 12D, 13D, and 14D connecting voltage conversion functional units 12A, 13A, and 14A to output terminal 10 are different from one another. Therefore, in the arrangement illustrated in FIG. 1, the DC resistances of output line parts 12D, 13D, and 14D is in proportion to a route length. Therefore, the DC resistance of output line part 12D is larger than the DC resistance of output line part 13D while the DC resistance of output line part 13D is larger than the DC resistance of output line part 14.

In power supply device 8, current adjustment functional units 12B, 13B, and 14B having different resistances are provided in output line parts 12D, 13D, and 14D having different resistances. Therefore, a total of DC resistances of output line part 12D and current adjustment functional unit 12B, a total of DC resistances of output line part 13D and current adjustment functional unit 13B, and a total of DC resistances of output line part 14D and current adjustment functional unit 14B are substantially equal to one another.

As described above, output line parts 12D, 13D, and 14D have lengths different from each other and have different resistances. The DC resistances of output line parts 12D, 13D, and 14D is in proportion to the route lengths. Therefore, the DC resistance of output line part 12D is larger than the DC resistance of output line part 13D while, the DC resistance of output line part 13D is larger than the DC resistance of output line part 14D. The DC resistances of current adjustment functional units 12B, 13B, and 14B gradually increase as output line parts 12D, 13D, and 14D decrease in converters 12, 13, and 14.

As a result, all DC resistances each provided between output terminal 10 and respective one of voltage conversion functional units 12A, 13A, and 14A become substantially equal. Voltage conversion functional units 12A, 13A, and 14A supply currents substantially equal to one another to the load and maintain a balance between the supplied currents and the supplied power. In other words, current adjustment functional units 12B, 13B, and 14B correct resistances each provided between output terminal 10 and respective one of current adjustment functional units 12B, 13B, and 14B in order to balance the supplied currents and the supplied power.

Voltage conversion functional units 12A, 13A, and 14A evenly output voltages higher than an output voltage required in output terminal 10. Voltage drops of the same value each between output terminal 10 and respective one of voltage conversion functional units 12A, 13A, and 14A is produced due to the DC resistances of the same value, and thus, the voltage required for even power is output from respective converters 12, 13, and 14 to output terminal 10.

Converters 12, 13, and 14 supply the voltages and currents to output terminal 10 that are equalized without variation. Therefore, in converters 12, 13, and 14, the thresholds for overcurrent limitation is set such that the overcurrent limitation function appropriately operates with respect to the capability for current supply equipped in converters 12, 13, and 14. In other words, converters 12, 13, and 14 can sufficiently exhibit the capability for current supply equipped in respective converters 12, 13, and 14. As a result, power supply device 8 has a wide operation range.

The output currents supplied from converters 12, 13, and 14 to output terminal 10 become values which are equalized without variation. Therefore, when the load connected to output terminal 10 rapidly changes, a variation of the output voltage in output terminal 10 is suppressed to become smaller. As a result, stability of the output voltage becomes higher.

For example, in the case that the load connected to output terminal 10 rapidly increase and increases a load current, only one of converters 12, 13, and 14 does not intensively respond to the increase of the load current. The increase of the load current is equally shared by converters 12, 13, and 14. Therefore, the output voltages of converters 12, 13, and 14 hardly change.

Since the increase of the load current is equally shared by converters 12, 13, and 14, the load currents in converters 12, 13, and 14 have margins substantially equal to one another with respect to the threshold for overcurrent limitation. Any one of the output currents of converters 12, 13, and 14 can hardly reach the threshold prior to the others, the output currents reach the threshold in all converters 12, 13, and 14 in a chain-reaction, thus preventing the operation range of power supply device 8 from decreasing.

Operations of voltage conversion functional units 12A, 13A, and 14A are controlled by controllers 12E, 13E, and 14E independently of one another based on the voltages of detection points 12F, 13F, and 14F connected to output parts 12DD, 13DD, and 14DD of voltage conversion functional units 12A, 13A, and 14A, respectively. Therefore, even when the number of converters increases or decreases accompanied by a change of the specification of power supply device 8, an independent control can easily respond to the change of specification compared to an intensive control where voltage conversion functional units 12A, 13A, and 14A are controlled based on the voltage of output terminal 10.

It is necessary to consider a power loss in output line parts 12D, 13D, and 14D in the intensive control of power. In the independent control compared to the intensive control, controllers 12E, 13E, and 14E may perform control by reflecting the output voltages of voltage conversion functional units 12A, 13A, and 14A. In particular, converters 12, 13, and 14 are arranged along a line on rectangular board 11. Therefore, it becomes necessary to consider a power loss in the intensive control of power, however, in the independent control, the power loss is not taken into account and thus, the specification, such as wirings, can easily change.

However, power supply device 8 may be configured by a concentrated control scheme in which voltage conversion functional units 12A, 13A, and 14A are controlled based on the voltage of the output terminal 10.

Although three converters 12, 13, and 14 are used, the number of converters as described above may increase or decrease.

Figure 2:
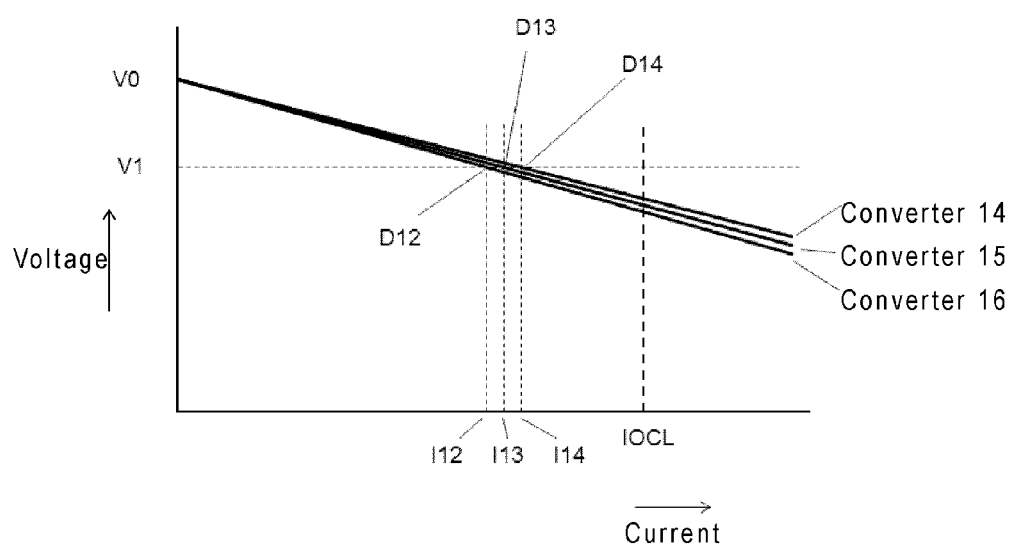
FIG. 2 is an operational relationship diagram of the power supply device shown in FIG. 1.

FIG. 2 is an operational relationship diagram in power supply device 8, and illustrates a relationship between the current and the voltage in that case that power supply device 8 outputs the maximum power. Current adjustment functional units 12B, 13B, and 14B allow output currents I12, I13, and I14 supplied from converters 12, 13, and 14 to output terminal 10 to be equal or substantially equal to one another. As a result, operation characteristics of converters 12, 13, and 14 overlap. In other words, the characteristics of the output power of converters 12, 13, and 14 become substantially equal to one another. Operating points D12, D13, and D14 of the current and the voltage become substantially the same position in converters 12, 13, and 14.

A state where any of operating points D12, D13, and D14 of converters 12, 13, and 14 is close to operation threshold IOCL of the overcurrent limitation functions, a state where any of operating points D12, D13, and D14 of converters 12, 13, and 14 is largely separated from threshold IOCL of the overcurrent limitation functions, or a state where operating points D12, D13, and D14 of converters 12, 13, and 14 are positioned to be scattered does not occur. With this, the operating points of converters 12, 13, and 14 are set to appropriate positions without having variation and the operation range may be appropriately obtained.

In other words, operating points D12, D13, and D14 change in the same direction by the same amount simultaneously in the overlapping position. A state where, among converters 12, 13, and 14, any converter easily exceeds operation threshold IOCL of the overcurrent limitation function, all converters 12, 13, and 14 exceed operation threshold IOCL in a chain-reaction with the excess as a clue, and finally the operation of power supply device 8 hardly stops. Alternatively, an allowable range of operation until the state where the operation power supply device 8 stops becomes larger.

This configuration avoids the situation that one of operating points of converters 12, 13, and 14 is largely separated from operation threshold IOCL of the overcurrent limitation function and thus the state where the capability of the converters cannot sufficiently utilized. Accordingly, power supply device 8 has a wide operation range for power supply.

Variation of operating points D12, D13, and D14 described above is the same situation as a situation that the output current changes instantaneously and largely by the rapid change of the load, as described above. Power supply device 8 can effectively operate as a power supply of an emergency response.

The overcurrent limitation function shown in FIG. 1 is not indicated as a specific functional unit. However, the overcurrent limitation functions may be disposed as elements constituting converters 12, 13, and 14, or the overcurrent limitation functions may be provided in voltage conversion functional units 12A, 13A, and 14A or controllers 12E, 13E, and 14E.

In current adjustment functional units 12B, 13B, and 14B, a field effect transistor (FET) having a predetermined DC resistance when current adjustment functional units 12B, 13B, and 14B are conductive may be used. For example, in the circuit illustrated in FIG. 1, an FET having the largest specific resistance may be used in current adjustment functional units 14B and an FET having the smallest specific resistance may be used in current adjustment functional units 12B.

In this case, at least a portion of output line part 12D may function as current adjustment functional unit 12B. The DC resistance of output line part 12D, a DC resistance of output line part 13D and current adjustment functional unit 13B, and a DC resistance due to output line part 14D and current adjustment functional unit 14B may be equal to one another.

In that case that an FET is used in each of current adjustment functional units 12B, 13B, and 14B, any of a P-channel type or an N-channel type may be applied. In that case that FETs are used in each of current adjustment functional units 12B, 13B, and 14B, controllers 12E, 13E, and 14E are connected to gates of the FETs and control the operation of the FETs. A resistance between a drain and a source of an FET when the drain is connected to the source may be used as the resistance of current adjustment functional units 12B, 13B, and 14B. The same FETs may be used or the FETs having different characteristics may be used in current adjustment functional units 12B, 13B, and 14B. When the same FETs are used, the FETs may have an individual resistance controlled in unsaturated regions. When the FETs having different characteristics are used, the FETs may have individual resistances controlled in saturated regions.

In power supply device 8, voltage conversion functional units 12A, 13A, and 14A preferably start operating simultaneously after all current adjustment functional units 12B, 13B, and 14B become conductive. Controllers 12E, 13E, and 14E can control timings of the operations of voltage conversion functional units 12A, 13A, and 14A.

This configuration prevents the operating points from being discretely positioned in converters 12, 13, and 14 or prevents any operating point from being close the threshold IOCL accompanied by the discrete positioning. The overcurrent limitation function is prevented from being operated under a situation which does not correspond to an original object even when a state of output power of converters 12, 13, 14 are unstable at the start of operating and the operation of power supply device 8 hardly stops.

Since current adjustment functional units 12B, 13B, and 14B can easily change or select a constant, the output current capacities of converters 12, 13, and 14 also can be easily set arbitrarily. A designer can easily respond to a change of design without being accompanied by a change of a width of wiring patterns constituting output line parts 12D, 13D, and 14D in power supply device 8.

As shown in FIG. 1, converters 12, 13, and 14 are arranged along a line along the longer-side direction of board 11 and the DC resistance of output line part 12D is larger than the DC resistance of output line part 13D while the DC resistance of output line part 13D is larger than the DC resistance of output line part 14D shown in the figure. The shape described above is preferable for an arrangement where an occupancy area of output line parts 12D, 13D, and 14D in board 11 is suppressed to be small with respect to board 11. This configuration allows connection points of output line parts 12D, 13D, and 14D to be close to output terminal 10, and decreases the area of a shared portion of output line parts 12D, 13D, and 14D. Therefore, a dead space on a mounting surface of board 11 is suppressed to be small.

Figure 3:
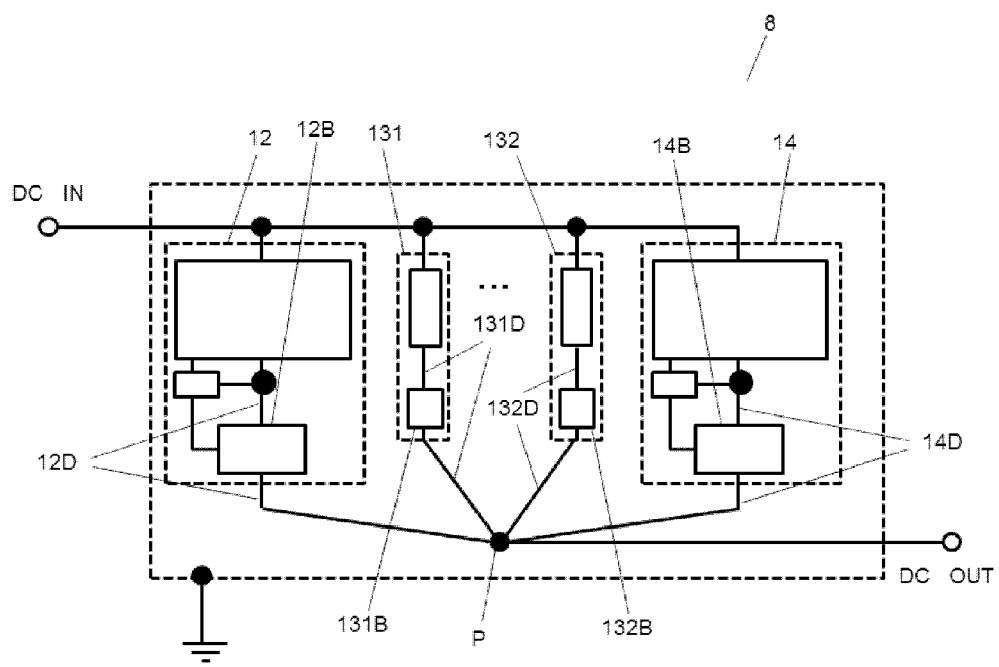
FIG. 3 is a circuit block diagram of the power supply device using another arrangement of converters in accordance with the embodiment.

However, converters 12, 13, 14 are not necessarily required to be arranged in the order of the DC resistances of output line parts 12D, 13D, and 14D. For example, converters 12, 13, and 14 may be arranged as illustrated in FIG. 3. FIG. 3 is a circuit block diagram of a power supply device with another arrangement of the converters in accordance with the embodiment. Converters 12 and 14 are disposed such that the DC resistance of output line part 12D which is the largest resistance becomes equal to the DC resistance of output line part 14D. This configuration allows two output line parts 12D and 14D of which DC resistances are largest and equal to each other. As described above, at least a portion of output line parts 12D and 14D having the largest DC resistance may function as current adjustment functional units 12B and 14B. Output line parts 12D and 14D can be substituted for current adjustment functional units 12B and 14B, thus providing converters 12 and 14 with small sizes.

In the case that converters 12 and 14 are disposed at both ends of board 11, converters 131 and 132 out of plural of converters disposed between the ends may be disposed at positions symmetrical to each other with respect to connection point P. In other words, converters 131 and 132 may be disposed such that the DC resistances of output line part 131D and output line part 132D are equal to each other from connection point P or output terminal 10. This configuration allows a circuit or an element having the same characteristic to be applied to current adjustment functional units 131B and 132B, and convenience is improved in designing a power supply device.

Figure 4:
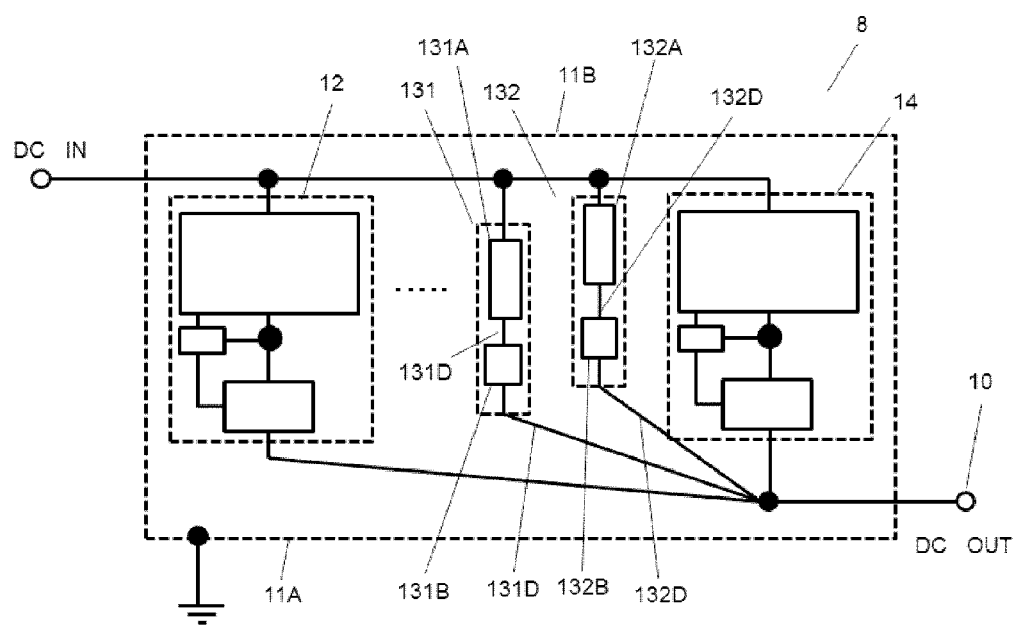
FIG. 4 is a circuit block diagram of the power supply device using still another arrangement of converters in accordance with the embodiment.

FIG. 4 is a circuit block diagram of a power supply device with another arrangement of converters in accordance with the embodiment. As illustrated in FIG. 4, converters 12, 131, 132, 14 are arranged substantially along a line and adjacent converters 131 and 132 do not face each other and do deviates from each other, and are connected in parallel. In other words, converters 131 and 132 may be arranged such that a distance between converter 131 and output terminal side 11A of board 11 is shorter than a distance between converter 132 and output terminal side 11A of board 11. Converter 131 is spaced from output terminal side 11C by a predetermined distance. Converter 132 is closer to output terminal shorter side 11C than converter 131. This arrangement allows output line part 131D and output line part 132D to be substantially the same length.

When output line part 131D and output line part 132D have approximately the same cross-sectional area, the DC resistances in output line part 131D and output line part 132D become substantially equal to each other. Circuits or elements having the same characteristic can be used in current adjustment functional units 131B and 132B. As a result, convenience in designing power supply device 8 such as a reduction in the number of components is improved.

Converters 131 and 132 are adjacent to each other but do not face each other to deviate from each other. Therefore, a distance between voltage conversion functional units 131A and voltage conversion functional units 132A becomes large. This configuration prevents heat generated by voltage conversion functional units 131A and 132A from concentrating to the center of board 11, and allows the heat to be easily dispersed to the entire surface of board 11. As a result, a heat dissipation property of board 11 is improved. Converters 12, 131, 132, and 14 are not necessarily required to be arranged along a straight line in the longer-side direction of rectangular board 11, and may be arranged along, e.g. a meandering line.

As described above, in particular, in the case that power supply device 8 is applied as a power supply of an emergency response, board 11 may have a rectangular shape and converters 12, 13, and 14 illustrated in FIG. 1 and converters 12, 131, 132, and 14 illustrated in FIG. 3 and FIG. 4 are preferably arranged substantially along a line.

Figure 5:
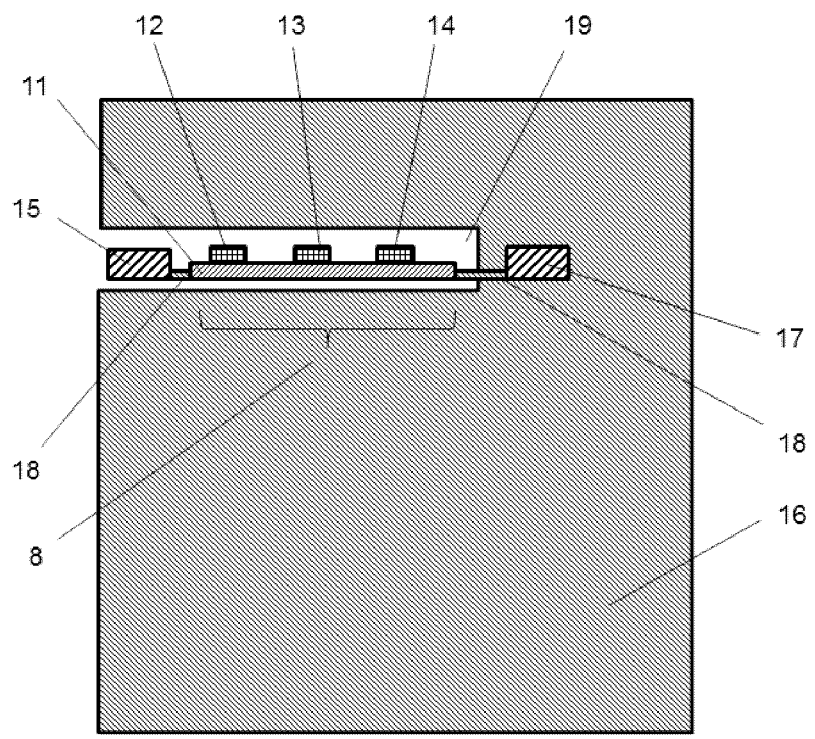
FIG. 5 is a sectional view of an electronic apparatus using the power supply device in accordance with the embodiment.

FIG. 5 is a sectional view of an electronic apparatus 16 using power supply device 8. For example, power supply device 8 in which converters 12, 13, and 14 are used to supply power stored in battery 15 to electronic apparatus 16 as emergency power. Battery 15 and power supply device 8, and power supply device 8 and power receiver 17 are connected with connector 18.

Power supply device 8 or battery 15 can be added to electronic apparatus 16. Battery 15 or power supply device 8 can supply arbitrary larger amounts of power in an emergency. Power supply device 8 or battery 15 is disposed in slot 19 provided in electronic apparatus 16 in a single set or a plurality of sets. Single slot 19 or plural slots 19 may be provided.

Therefore, converters 12, 13, and 14 are preferably arranged along a line on board 11 having in a rectangular plate shape in a longer-side direction such that power supply device 8 is easily inserted into slot 19 provided in a region of which an occupation area is small or an occupation volume is limited. Since board 11 has a rectangular shape and converters 12, 13, and 14 are arranged along a line, the position of slot 19 is not limited in electronic apparatus 16 and slot 19 is easily disposed at an arbitrary position.

In FIG. 5, all converters 12, 13, and 14 are disposed on one side of the upper surface of board 11. Converters 12, 13, and 14 may be disposed on the upper surface and the lower surface of board 11 separated from each other.

In FIG. 1, FIG. 3, and FIG. 4, a configuration in which current adjustment functional units 12B, 13B, 14B, 131B, and 132B are included in converters 12, 13, 14, 131, and 132 is illustrated. However, current adjustment functional units 12B, 13B, 14B, 131B, and 132B are not limited to the configuration in which adjustment functional units 12B, 13B, 14B, 131B, and 132B are included in converters 12, 13, and 14, 131, 132. For example, regarding converter 12, even though voltage conversion functional unit 12A, current adjustment functional unit 12B, input line part 12C, output line part 12D, and controller 12E are disposed at positions separated from one another, the function of these components may be totally referred to as converter 12. Voltage conversion functional unit 12A, current adjustment functional unit 12B, and controller 12E each constituting individual converter 12 may be disposed on the upper surface and the lower surface of board 11 separated from each other.

Input line parts 12C, 13C, and 14C and output line parts 12D, 13D, and 14D may be wirings having pattern shapes or a wire conductor formed on the upper surface or the lower surface of board 11.

INDUSTRIAL APPLICABILITY

As described above, according to the present disclosure, a burden of outputting power is not concentrated to a particular converter and the capability related to the supply of current equipped in each of the converters can be sufficiently exhibited. As a result, an advantageous effect that the operation range is expanded in a power supply device is obtained and is useful as a power supply device.

REFERENCE MARKS IN THE DRAWINGS 8 power supply device
9 input terminal
10 output terminal
11 board
11A output terminal side
11B input terminal side
11C output terminal shorter side
12, 13, 14, 131, 132 converter
12A, 13A, 14A, 131A, 132A voltage conversion functional unit
12B, 13B, 14B, 131B, 132B current adjustment functional unit
12C, 13C, 14C input line part
12CC, 13CC, 14CC input part
12D, 13D, 14D, 131D, 132D output line part
12DD, 13DD, 14DD output part
12E, 13E, 14E controller
12F, 13F, 14F detection point
15 battery
16 electronic apparatus
17 power receiver
18 connector
19 slot

The invention claimed is:

1. A power supply device comprising:
a board that includes an input terminal and an output terminal; and a plurality of converters disposed on the board, the plurality of converters being connected with each other in parallel, convert an input voltage input to the input terminal, and output the converted voltage to the output terminal,
wherein each of the plurality of converters includes:
respective one of voltage conversion functional units including respective one of input parts and respective one of output parts,
respective one of input line parts connected to respective one of the input parts and between the input terminal and the respective one of the input parts,
respective one of output line parts connected to respective one of the output parts and between the output terminal and the respective one of the output parts, and
respective one of current adjustment functional units provided in the respective one of the output line parts for balancing currents output from the plurality of converters, and
wherein the respective one of the current adjustment functional units has respective one of direct-current resistances provided between the output terminal and the respective one of the output parts, and corrects the respective one of the direct-current resistances for balancing the currents output from the plurality of converters.

2. The power supply device of claim 1, wherein each of the current adjustment functional units includes a resistance between a drain and a source of a field effect transistor.

3. The power supply device of claim 1,
wherein a surface of the board having the plurality of converters disposed thereon has a rectangular shape, and wherein the plurality of converters are arranged in a longer-side direction of the board.

4. The power supply device of claim 1,
wherein the output line parts of the plurality of converters have lengths different from each other, and
wherein the direct-current resistances of the current adjustment functional units increase as the output lines becomes shorter in the plurality of converters.

5. The power supply device of claim 1, wherein the respective one of the voltage conversion functional units is controlled based on a voltage of the respective one of the output parts.

6. A power supply device comprising:
a board that includes an input terminal and an output terminal; and
a plurality of converters disposed on the board, the plurality of converters being connected with each other in parallel, convert an input voltage input to the input terminal, and output the converted voltage to the output terminal,
wherein each of the plurality of converters includes:
respective one of voltage conversion functional units including respective one of input parts and respective one of output parts,
respective one of input line parts connected to respective one of the input parts,
respective one of output line parts connected to respective one of the output parts, and
respective one of current adjustment functional units provided in respective one of the output line parts for balancing currents output from of the plurality of converters,
wherein the output line parts of the plurality of converters have lengths different from each other, and
wherein direct-current resistances of the current adjustment functional units increase as the output lines becomes shorter in the plurality of converters.

7. The power supply device of claim 6, wherein each of the current adjustment functional units includes a resistance between a drain and a source of a field effect transistor.

8. The power supply device of claim 6,
wherein a surface of the board having the plurality of converters disposed thereon has a rectangular shape, and
wherein the plurality of converters are arranged in a longer-side direction of the board.

9. The power supply device of claim 6, wherein the respective one of the voltage conversion functional units is controlled based on a voltage of the respective one of the output parts.

* * * * *